(12) United States Patent
Fukushima (10) Patent No.: US 6,995,541 B2
(45) Date of Patent: Feb. 7, 2006

(54) BATTERY PACK WITH ENGAGEMENT CONCAVE PORTION AND BATTERY-USING EQUIPMENT USING BATTERY PACK (75) Inventor: Akira Fukushima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 10/760,828

(22) Filed: Jan. 20, 2004

(65) Prior Publication Data

US 2004/0145341 A1 Jul. 29, 2004

(30) Foreign Application Priority Data

Jan. 24, 2003 (JP) .............................. 2003-015640

(51) Int. Cl.
*H01M 10/46* (2006.01)
(52) U.S. Cl. ..................................... 320/112

(58) Field of Classification Search ................ 320/107, 320/112, 114; 429/96, 99, 100
See application file for complete search history.

(56) References Cited

U.S. PATENT DOCUMENTS 5,518,198 A * 5/1996 Chumbley et al. ......... 242/405.1
5,861,873 A * 1/1999 Kikinis ........................ 345/157

* cited by examiner

*Primary Examiner*—Edward H. Tso
(74) *Attorney, Agent, or Firm*—Cowan, Liebowitz & Latman, P.C.

(57) ABSTRACT

A concave portion serving as an erroneous insertion prevention groove is provided on a bottom of a battery pack along a battery pack attachment direction and an engagement concave portion engaged with an engagement member is provided in an battery-mounting equipment, whereby the detachment of the battery from the battery-mounting equipment can be prevented.

5 Claims, 6 Drawing Sheets

BATTERY PACK WITH ENGAGEMENT CONCAVE PORTION AND BATTERY-USING EQUIPMENT USING BATTERY PACK

BACKGROUND OF THE INVENTION

1. Field of the Invention

The present invention relates to an improved battery pack and an improved battery-using equipment that includes a battery compartment having an engagement portion engaged with a concave portion of the battery pack.

2. Related Background Art

The structure of a currently, commercially available secondary battery-using equipment for fixing a secondary battery pack to a battery compartment will be described with reference to FIGS. 1A and 1B. FIG. 1B is a sectional view taken along line 1B—1B shown in FIG. 1A.

Figure 1A:
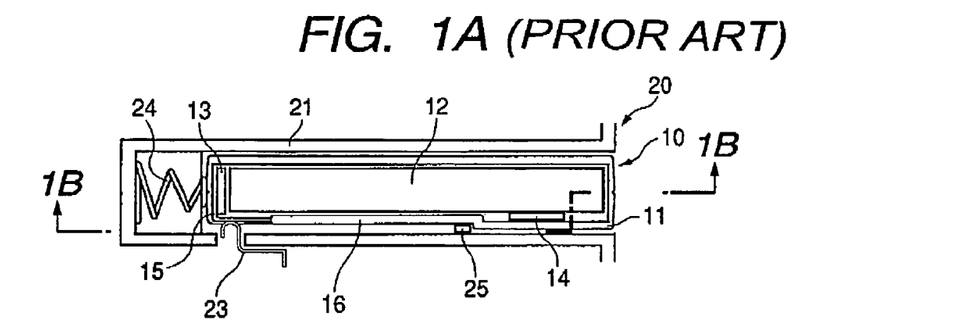
FIGS. 1A and 1B are block diagrams which illustrate important parts of a conventional secondary battery-using equipment.
Figure 1B:
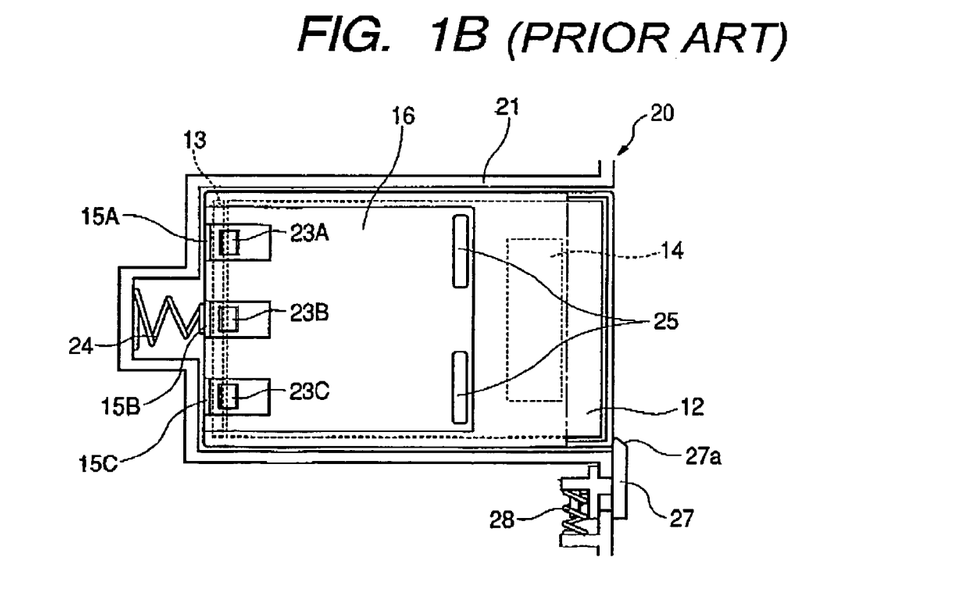

In FIGS. 1A and 1B, reference numeral 10 denotes a battery pack, 11 denotes a case of the battery pack 10, 12 denotes a secondary battery, 13 denotes a control substrate, 14 denotes a protection apparatus, 15A denotes a battery positive (+) contact, 15B denotes a battery T contact, 15C denotes a battery negative (−) contact, and 16 denotes a concave portion that acts, together with an engagement portion 25 to be described later, as an insertion error prevention function.

Further, reference numeral 20 denotes a battery compartment, 21 denotes an outer wall of the battery compartment 20, 23A denotes a positive (+) connection terminal, 23B denotes a T connection terminal, 23C denotes a (−) connection terminal, 24 denotes an ejection spring, 25 denotes an engagement portion that is engaged with the concave portion 16 to thereby prevent the battery pack 10 from being erroneously inserted into the battery compartment 20, 27 denotes a lock lever, and 28 denotes a lock spring.

Figure 4:
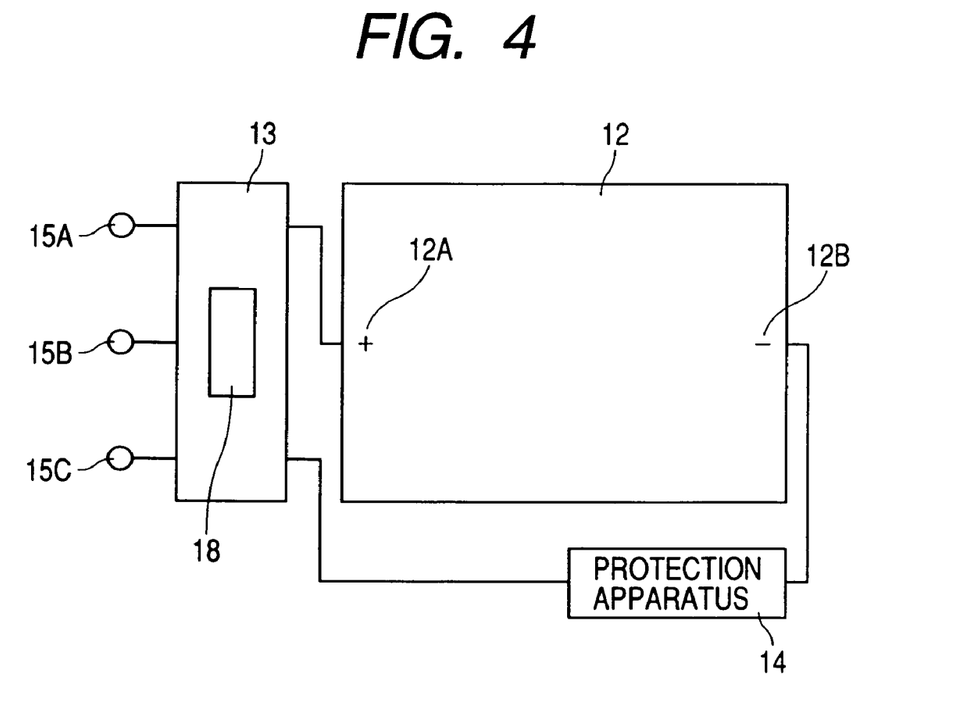
FIG. 4 is a circuit diagram which illustrates a wiring state in the battery pack shown in FIGS. 1A, 1B, 2A, 2B, 5A, 5B, 6A and 6B.

FIG. 4 illustrates the internal circuit configuration of the battery pack 10. In FIG. 4, reference numeral 12A denotes a positive (+) electrode of the secondary battery 12, 12B denotes a negative (−) electrode of the secondary battery 12, and 18 denotes a thermistor mounted on the control substrate 13.

The battery pack 10 is constituted as follows. The control substrate 13 and the protection apparatus 14 are arranged in the battery pack 10, i.e., around the secondary battery 12 so as to avoid an increase in a volume of the battery pack 10 as much as possible. The concave portion 16 is arranged in an outer portion of the battery pack 10 on which the control substrate 13 and the protection apparatus 14 are not arranged, so as to have a predetermined length in a direction from an insertion end toward an insertion direction. The battery pack 10 is packed with the case 11 that holds the battery positive (+) contact 15A, th battery T contact 15B, and the battery negative (−) contact 15C. The battery pack 10 thus constituted will be referred to as "secondary battery packs" (battery pack) according to the present invention.

In FIG. 4, the positive (+) electrode 12A of the secondary battery 12 is electrically connected to the control substrate 13 whereas the negative (−) electrode 12B thereof is electrically connected to the control substrate 13 through the protection apparatus 14. The battery positive (+) contact 15A, the battery T contact 15B, and the battery negative (−) contact 15C are electrically connected to the control substrate 13.

The secondary battery 12 is protected by the protection apparatus 14 so that it electrically shuts off the secondary battery 12 from an excessive current when the excessive current flows. The circuit blocks off the control substrate 13 when an excessive charge voltage is impressed and a battery voltage of the secondary battery 12 declines exceedingly, and thereby protects the secondary battery 12. By allowing the thermistor 18 on the control substrate 13 to output an internal temperature of the battery pack 10 as a resistance, a state of the secondary battery 12 can be determined.

Referring to FIGS. 1A and 1B, if the battery pack 10 is normally inserted into the battery compartment 20, the engagement portion 25 enters the concave portion 16. During this insertion, a tapered portion 27a of the lock lever 27 is pressed against the insertion end of the battery pack 10. Due to this, the lock lever 27 is slid downward in FIGS. 1A and 1B against an urging force of the lock spring 28. If the battery pack 10 is completely inserted into the battery compartment 20, the lock lever 27 is moved by a spring force of the lock spring 28 to press a rear end face of the battery pack 10 (slid upward in FIGS. 1A and 1B), thereby preventing the battery pack 10 from being ejected from the compartment 20. In this state, the battery positive (+) contact 15A is electrically connected to the positive (+) connection terminal 23A, the battery T contact 15B is electrically connected to the T connection terminal 23B, and the battery negative (−) contact 15C is electrically connected to the negative (−) connection terminal 23C, whereby the battery pack 10 is electrically connected to the battery compartment 20.

When the battery pack 10 is to be detached from the battery compartment 20, the lock lever 27 is moved to be away from the rear end face of the battery pack 10 (slid downward in FIGS. 1A and 1B) to thereby eject the battery pack 10 from the battery compartment 20 by a spring force of the ejection spring 24. In case that the battery pack 10 is inserted into the battery compartment 20 in a direction different from th predetermined insertion direction, the case 11 of the battery pack 10 abuts against the engagement portion 25. As a result, the battery pack 10 cannot be inserted further, thereby making it possible to prevent the erroneous insertion of the battery pack 10. The same configuration is disclosed by Japanese Patent Application Laid-Open No. 2002-287225.

With the configuration of the conventional battery pack 10 described above, when the battery pack 10 is completely inserted into the battery compartment 20, the lock lever 27 is moved by the force of the lock spring 28 to press the rear end face of the battery pack 10, thereby preventing the ejection of the battery pack 10. That is, since the engagement of the battery pack 10 is made rearward in the insertion direction of the battery pack 10, it is disadvantageously required to enlarge the battery chamber 20 by as much as a thickness of the lock lever 27 in the insertion direction.

SUMMARY OF THE INVENTION

It is an object of the present invention to provide a secondary battery-using equipment an overall size of which equipment can be made small.

In order to achieve the above object, according to one aspect of the present invention, a battery pack of the present invention, that contains a battery therein, comprises a connection terminal for connecting the battery to a battery-using equipment, a concave portion arranged in an outer portion of the battery pack in a direction from an insertion end toward an insertion direction, a connection terminal arranged in the concave portion, and an engagement concave portion, provided adjacently to the concave portion, for being engaged with an engagement member provided in the battery-using equipment.

According to the present invention thus constituted, when the battery pack is completely inserted, the engagement member is engaged with the engagement concave portion to thereby fix the battery pack to the battery compartment and prevent the detachment of the battery pack. Further, a size of the battery compartment can be made small in a direction in which the battery is inserted.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

The embodiments of the present invention will be described hereinafter with reference to the drawings.

First embodiment

Figure 2A:
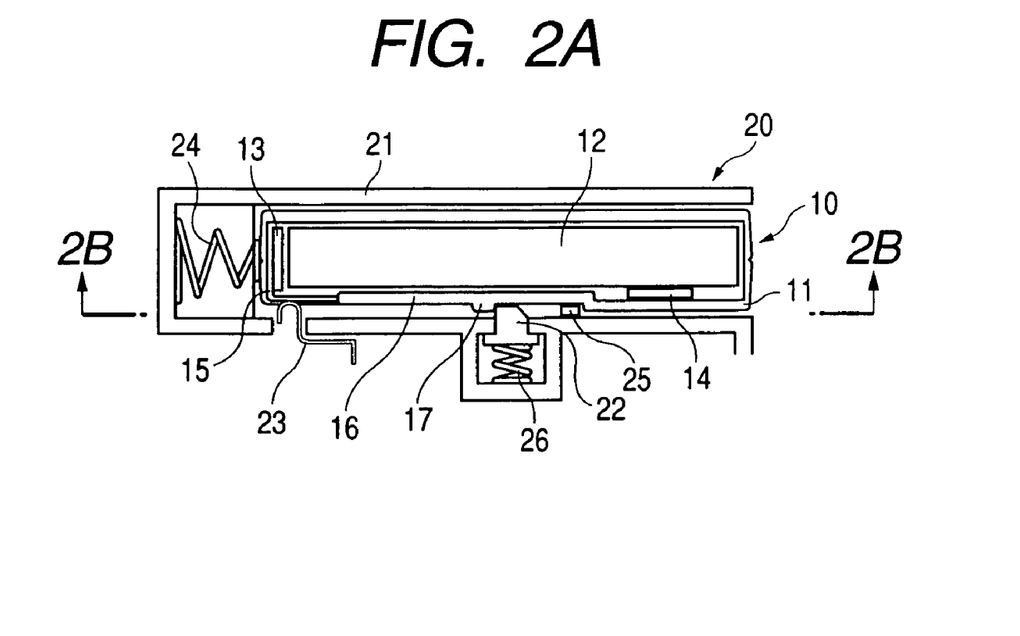
FIGS. 2A and 2B are block diagrams which illustrate important parts of a secondary battery-using equipment in the first embodiment of the present invention.
Figure 2B:
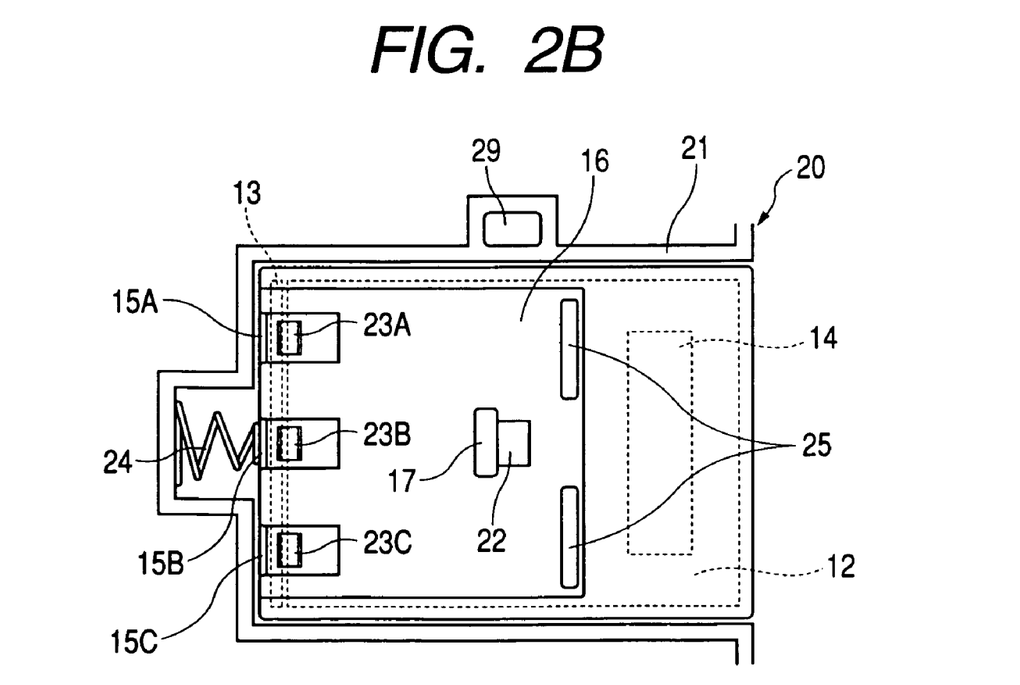

FIGS. 2A, 2B, 3A, and 3B are block diagrams which illustrate important parts of a secondary battery-using equipment in the first embodiment of the present invention. In FIGS. 2A and 2B to FIGS. 3A and 3B, the same constituent elements as those in FIGS. 1A and 1B are denoted by the same reference numerals as those in FIGS. 1A and 1B and will not be described herein. FIG. 2B is a sectional view taken along a line 2B—2B shown in FIG. 2A.

In FIGS. 2A and 2B, reference numeral 17 denotes a protrusion provided in part of a concave portion 16 of the battery pack 10. Reference numeral 22 denotes an engagement lever movable forward and backward relative to the battery compartment 20, and 26 denotes an engagement spring. The engagement lever 22 and the engagement spring 26 constitute an engagement member that is engaged with the protrusion 17, i.e., that fixes the battery pack 10 inserted into the battery compartment 20 to a fixed position and prevents the detachment of the battery pack 10 from the compartment 20. Reference numeral 29 is an unlock button which is formed integrally with the engagement lever 22.

Th int rnal circuit configuration of the battery pack 10 shown in FIGS. 2A and 2B is the same as that shown in FIG. 4.

The battery pack 10 is constituted as follows. The control substrate 13 and the protection apparatus 14 are arranged in the battery pack 10, i.e., around the secondary battery 12 so as to prevent an increase in a volume of the battery pack 10 as much as possible. The concave portion 16 is provided in an outer portion in which the control substrate 13 and the protection apparatus 14 are not arranged, so as to have a predetermined length in a direction from an insertion end toward an insertion direction. The battery pack 10 is packed with the case 11 that holds the battery positive (+) contact 15A, the battery T contact 15B, and the battery negative (−) contact 15C.

Figure 3A:
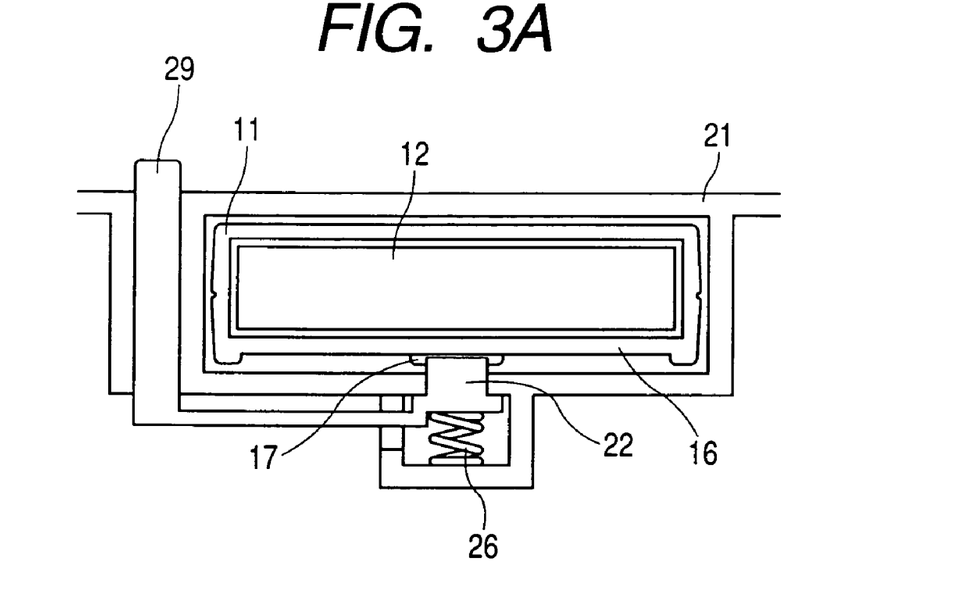
FIGS. 3A and 3B are block diagrams which illustrate a state in which a battery pack is attached to a battery compartment and a state in which the battery pack is detached from the battery compartment in the first embodiment, respectively.
Figure 3B:
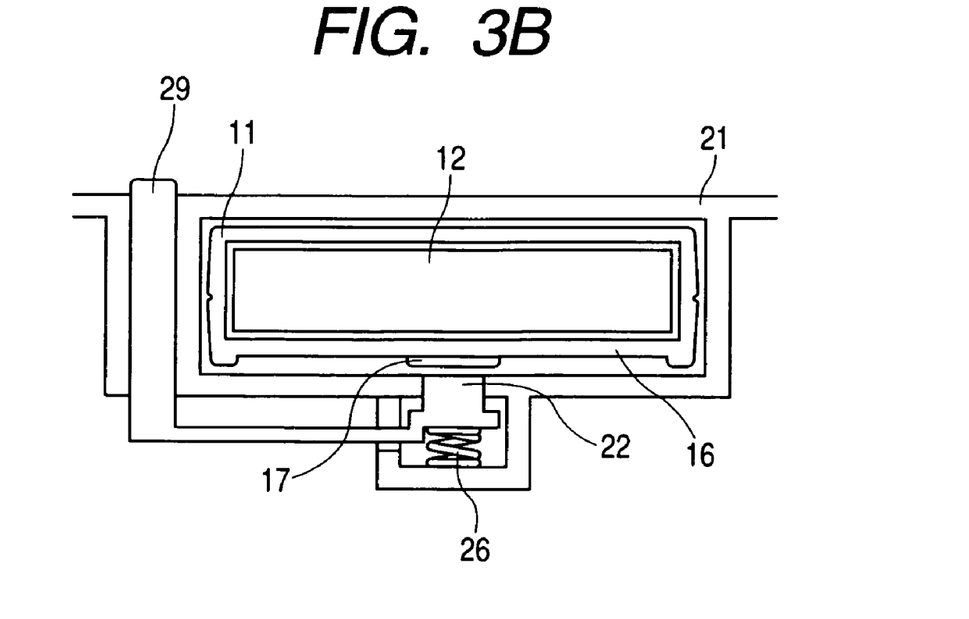

As shown in FIGS. 3A and 3B, the positive (+) electrode 12A of the secondary battery 12 is electrically connected to the control substrate 13 whereas the negative (−) electrode 12B thereof is electrically connected to the control substrate 13 through the protection apparatus 14. The battery positive (+) contact 15A, the battery T contact 15B, and the battery negative (−) contact 15C are electrically connected to the control substrate 13.

The secondary battery 12 is protected by the protection apparatus 14 so that it electrically shuts off the secondary battery 12 from an excessive current when the excessive current flows. The circuit blocks off the control substrate 13 when an excessive charge voltage is impressed and a battery voltage of the secondary battery 12 declines exceedingly, and thereby protects the secondary battery 12. By allowing the thermistor 18 on the control substrate 13 to output an internal temperature of the battery pack 10 as a resistance, a state of the secondary battery 12 can be determined.

With the configuration stated above, if the battery pack 10 is normally inserted into the battery compartment 20, the concave portion 16 of the battery pack 10 is engaged with an engagement portion 25 of the battery compartment 20. While the battery pack 10 is being inserted, one end side of the protrusion 17 provided in g part of the concave portion 16 (a left side in FIGS. 2A and 2B) abuts against the engagement lever 22 that is a constituent element of the engagement member. The engagement lever 22 is tapered on a right side as shown in FIG. 2A and 2B and constituted to be movable forward and backward relative to the battery compartment 20 by the engagement spring 26. Therefore, the battery pack 10 can overpass the tapered portion of the engagement lever 22 and thereby can be smoothly moved in the insertion direction while the engagement lever 22 is retreated downward of the battery compartment 20. After the battery pack 10 is completely inserted into the battery compartment 20, the protrusion 17 is away from a position at which the protrusion faces the engagement lever 22 and the pressing of the engagement lever 22 by the protrusion 17 is released. As a result the engagement lever 22 returns to an original state in which the engagement spring 26 urges the engagement lever 22 to enter the battery compartment 20. FIGS. 2A, 2B, and 3A illustrate this state. In this state, as shown in FIGS. 2A, 2B, and 3A, the engagement lever 22 is engaged with the other end side of the protrusion 17. The battery pack 10 is fixed to the battery compartment 20, accordingly. In other words, it is possible to prevent the battery pack 10 from being inadvertently detached from the battery compartment 20 of the secondary battery-using equipment.

In this state, the battery positive (+) contact 15A is electrically connected to the positive. (+) contact terminal 23A, the battery T contact 15B is electrically connected to the T contact terminal 23B, and the battery negative (−) contact 15C is electrically connected to the negative (−) contact terminal 23C, whereby the battery pack 10 is electrically connected to the battery compartment 20.

In the case the battery pack 10 is to be detached from the battery compartment 20, the unlocked button 29 integral with the engagement lever 22 is depressed to thereby retreat the engagement lever 22 from the battery compartment 20. As shown in FIG. 3B, the engagement lever 22 is disengaged from the protrusion 17, whereby the battery pack 10 is ejected from the battery compartment 20 by a spring force of the ejection spring 24.

If the battery pack 10 is inserted into the battery compartment 20 in a direction different from the predetermined insertion direction, the case 11 of the battery pack 10 abuts on the engagement portion 25 that functions, together with the concave portion 16, to prevent the erroneous insertion of the battery pack 10. As a result, the battery pack 10 cannot be inserted into the battery compartment 20 further, thereby making it possible to ensure preventing the erroneous insertion of the battery pack 10.

Second embodiment

Figure 5A:
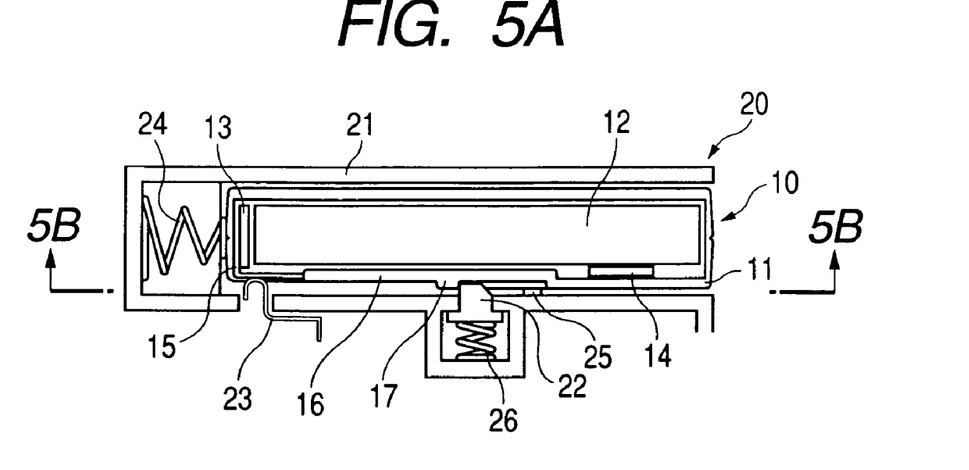
FIGS. 5A and 5B are block diagrams which illustrate important parts of a secondary battery-using equipment in the second embodiment of the present invention.
Figure 5B:
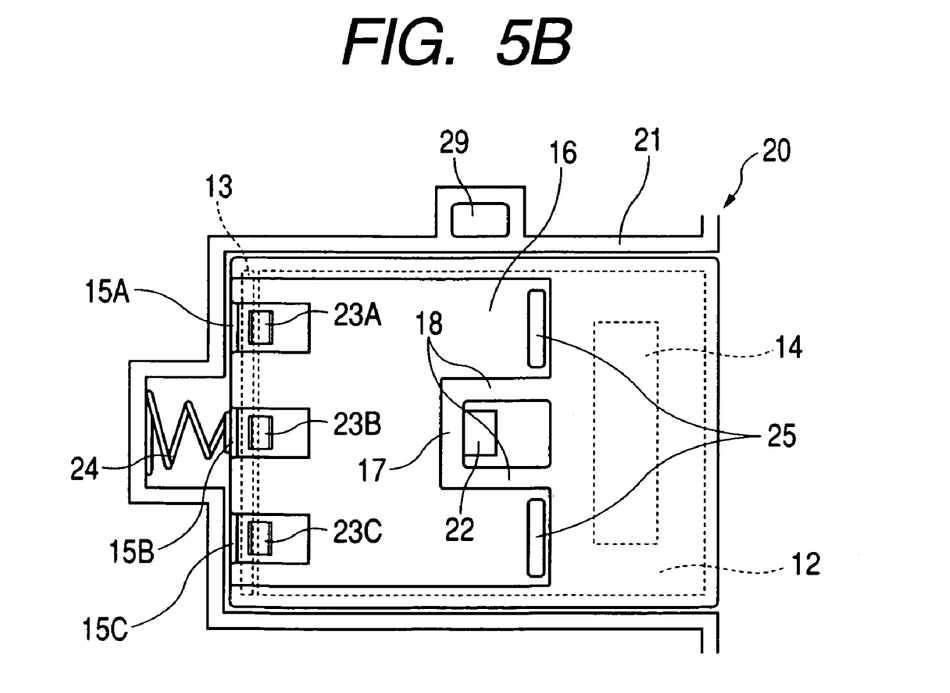

FIGS. 5A, 5B, 6A, and 6B are block diagrams which illustrate important sections of a secondary battery-using equipment in the second embodiment of the present invention. In FIGS. 5A and 5B to FIGS. 6A and 6B, the same constituent elements as those in FIGS. 2A and 2B, 3A and 3B, and 1A and 1B are denoted by the same reference numerals will not be described herein. FIG. 5B is a sectional view taken along a line 5B-5B shown in FIG. 5A.

In FIGS. 5A and 5B to FIGS. 6A and 6B, reference numeral 18 is a reinforcement portion that reinforces the protrusion 17 and that is provided on each side of the protrusion 17 in order to surround it. To be specific, the insertion portion 18 is provided to reinforce the protrusion 17 to prevent the protrusion 17 from being deformed and damaged when a load or an excessive load is exerted on the protrusion 17 in the insertion direction or the like.

The int rnal circuit configuration of the battery pack 10 shown in FIGS. 5A and 5B is the same as that shown in FIG. 4.

The battery pack 10 is constituted as follows. The control substrate 13 and the protection apparatus 14 are arranged on the battery pack 10, i.e., around the secondary battery 12 so as to prevent an increase in a volume of the battery pack 10 as much as possible. The concave portion 16 is provided so as to have a predetermined length in a direction from an insertion end toward an insertion direction in an outer portion in which the control substrate 13 and the protection apparatus 14 are not arranged. The battery pack 10 is packed with a case 11 that holds the battery positive (+) contact 15A, the battery T contact 15B, and the battery negative (−) contact 15C.

As shown in FIG. 4, the positive (+) electrode 12A of the secondary battery 12 is electrically connected to the control substrate 13 whereas the negative (−) electrode 12B thereof is electrically connected to the control substrate 13 through the protection apparatus 14. The battery positive (+) contact 15A, the battery T contact 15B, and the battery negative (−) contact 15C are electrically connected to the control substrate 13.

The secondary battery 12 is protected by the protection apparatus 14 so that it electrically shuts off the secondary battery 12 from an excessive current when the excessive current flows. The circuit blocks off the control substrate 13 when an excessive charge voltage is impressed and a battery voltage of the secondary battery 12 declines exceedingly, and thereby protects the secondary battery 12. By allowing the thermistor 18 on the control substrate 13 to output an internal temperature of the battery pack 10 as a resistance, a state of the secondary battery 12 can be determined.

Figure 6A:
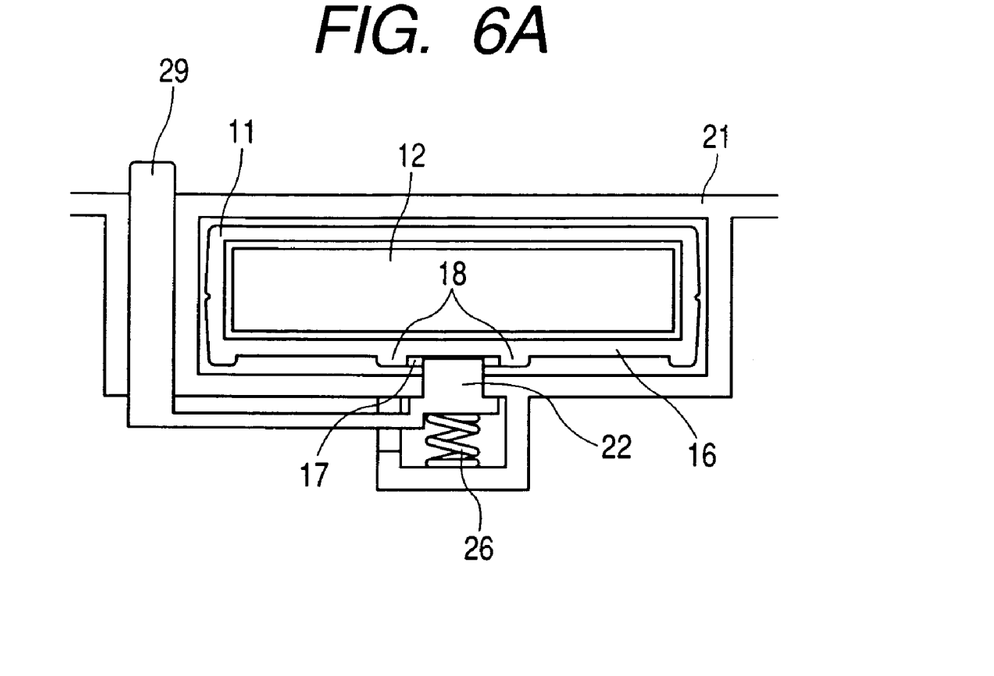
FIGS. 6A and 6B are block diagrams which illustrate a state in which the battery pack is attached to the battery compartment and a state in which the battery pack is detached from the battery compartment in the second embodiment, respectively.

With the configuration stated above, when the battery pack 10 is normally inserted into the battery compartment 20, the concave portion 16 of the battery pack 10 is engaged with an engagement portion 25 of the battery compartment 20. While the battery pack 10 is being inserted, one side of the protrusion 17 which is provided in a part of the concave portion 16 and each side of which is reinforced by the reinforcement portion 18 (a left side in FIGS. 5A and 5B) abuts against the engagement lever 22 that is a constituent element of the engagement member. The engagement lever 22 is tapered on a right side as shown in FIG. 5A and constituted to be movable forward and backward relative to the battery compartment 20 by the engagement spring 26. Therefore, the battery pack 10 can overpass the tapered portion of the engagement lever 22 and thereby can be smoothly moved in the insertion direction while the engagement lever 22 is retreated downward of the battery compartment 20. After the battery pack 10 is completely inserted into the battery compartment 20, die protrusion 17 is away from a position at which the protrusion faces the engagement lever 22 and the pressing of the engagement lever 22 by the protrusion 17 is released. As a result the engagement lever 22 returns to an original state in which the engagement spring 26 urges the engagement lever 22 to enter the battery compartment 20. FIGS. 5A, 5B and 6A illustrate this state. In this state, as shown in FIGS. 5A, 5B and 6A, the engagement lever 22 is engaged with the other end side of the protrusion 17. The battery pack 10 is fixed to the battery compartment 20, accordingly. In other words, it is possible to prevent the battery pack 10 from being inadvertently detached from the battery compartment 20 of the secondary battery-using equipment.

In this state, the battery positive (+) contact 15A is electrically connected to the positive (+) contact terminal 23A, the battery T contact 15B is electrically connected to the T contact terminal 23B, and the battery negative (−) contact 15C is electrically connected to the negative (−) contact terminal 23C, whereby the battery pack 10 is electrically connected to the battery compartment 20.

Figure 6B:
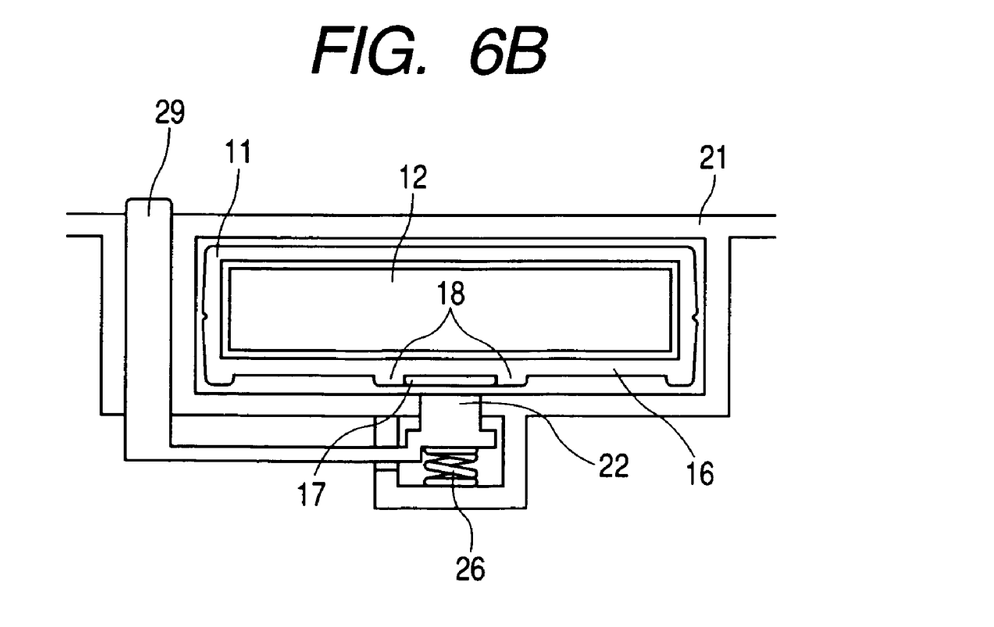

When the battery pack 10 is to be detached from the battery compartment 20, the unlock button 29 integrated with the engagement lever 22 is depressed to thereby retreat the engagement lever 22 from the battery compartment 20. As shown in FIG. 6B, the engagement lever 22 is disengaged from the protrusion 17, whereby the battery pack 10 is ejected from the battery compartment 20 by a spring force of the ejection spring 24.

If the battery pack 10 is inserted into the battery compartment 20 in a direction different from the predetermined insertion direction, the case 11 of the battery pack 10 abuts on the engagement portion 25 that functions, together with the concave portion 16, to prevent the erroneous insertion of the battery pack 10. As a result, the battery pack 10 cannot be inserted into the battery compartment 20 further, thereby making it possible to ensure preventing the erroneous insertion of the battery pack 10.

According to the embodiments of the present invention described so far, the protrusion 17 is provided in a part of the concave portion 16 provided in the battery pack 10. The engagement member (that consists of the engagement lever 22 and the engagement spring 26) movable forward and backward relative to the battery compartment 20 is provided at a position, at which the engagement member faces the concave portion 16 when the battery pack 10 is inserted, in the battery compartment 20. When the battery pack 10 is completely inserted into the battery compartment 20, the engagement member is engaged with the protrusion 17 to thereby fix the battery pack 10 to the battery compartment 20. Therefore, as compared with the conventional battery pack engaged rearward in the insertion direction, the size of the battery compartment 20 in the direction in which the battery pack 10 is inserted can be made small, the size of the overall equipment can be made small, and it is possible to prevent the detachment of the battery pack 10 from the secondary battery-using equipment without enlarging the battery pack 10.

Moreover, since the reinforcement portion 18 surrounds the protrusion 17 to prevent the protrusion 17 from being deformed and damaged by an external force, it is possible to protect the protrusion 17 of the battery pack 10 from an external, abnormal load.

The battery pack according to the present invention is constituted to include a battery cell having such a secondary battery as a rechargeable Ni-Cd or lithium ion battery. However, the battery is not limited to the secondary battery and the battery pack may be constituted so as to contain, for example, a primary dry battery in an exchangeable manner. Further, the battery pack of the present invention can be applied to a configuration in which electronic equipment such as a digital camera, a video camera, or a charging device that charges the battery pack is provided as the battery-using equipment.

The present invention is not limited to the above embodiments and various changes and modifications can be made within the spirit and scope of the present invention. Therefore, to apprise the public of the scope of the present invention the following claims are made.

What is claimed is:

1. A battery pack for containing a battery therein, comprising:
   a connection terminal for connecting the battery to an equipment using the battery;
   a concave portion arranged in an outer portion of the battery pack in a direction from an insertion end toward an insertion direction; and
   an engagement concave portion arranged so as to overpass a protrusion provided in part of the concave portion while the battery pack is being inserted into the battery-using equipment along the concave portion, thereby engaging with an engagement member provided in the equipment using the battery.

2. The battery pack according to claim 1, wherein the battery is a secondary battery.

3. A battery-using equipment including a battery compartment having an engagement portion which is engaged with a concave portion arranged in an outer portion of a battery pack in a direction from an insertion end toward an insertion direction, when the battery pack is inserted into the battery compartment, the battery-using equipment comprising:
   a connection terminal for connecting the battery and the battery-using equipment; and
   an engagement member arranged so as to overpass a protrusion provided in part of the concave portion of the battery pack while the battery pack is being inserted into the battery compartment, thereby engaging with an engagement member provided in the battery-using equipment.

4. The equipment using the battery according to claim 3, wherein the battery-using equipment is a digital camera.

5. The equipment using the battery according to claim 3, wherein the battery-using equipment is a charging device.

* * * * *